United States Patent [19]
David

[11] 3,801,198
[45] Apr. 2, 1974

[54] APPARATUS FOR AUTOMATIC HALF-TONE (DIRECT-SCREEN) OR CONTINUOUS TONE COLOUR SEPARATION WORK IN PHOTOMECHANICAL REPRODUCTION

[75] Inventor: Michel David, Arcueil, France

[73] Assignee: Logabax, Paris, France

[22] Filed: Nov. 30, 1971

[21] Appl. No.: 203,182

Related U.S. Application Data

[63] Continuation-in-part of Ser. No. 887,087, Dec. 22, 1969, abandoned.

[30] Foreign Application Priority Data

| Dec. 23, 1968 | France | 68.179999 |
| Dec. 22, 1969 | Germany | 1964129 |
| Dec. 22, 1969 | Great Britain | 62364/69 |
| Dec. 17, 1969 | Italy | 42258/69 |
| Dec. 17, 1969 | Sweden | 17439/69 |
| Dec. 23, 1969 | Japan | 44-103347 |

[52] U.S. Cl............. 355/32, 355/54, 355/71
[51] Int. Cl.. G03b 27/58, G03b 27/66, G03b 27/76
[58] Field of Search........... 355/32, 35–38, 355/53, 54, 71, 113, 21

[56] References Cited
UNITED STATES PATENTS

| 3,644,036 | 2/1972 | Canfield | 355/44 |
| 3,682,547 | 8/1972 | Ratowsky | 355/54 X |
| 3,627,416 | 12/1971 | Benson | 355/89 X |
| 3,476,477 | 11/1969 | Balint | 355/35 |
| 3,151,535 | 10/1964 | Hahn | 95/64 D |
| 2,466,154 | 4/1949 | Conklin | 355/35 |
| 3,292,486 | 12/1966 | Mey | 355/32 X |
| 3,155,001 | 11/1964 | Sites | 355/35 |
| 3,260,153 | 7/1966 | Abbott, Jr. et al. | 355/36 |

*Primary Examiner*—Samuel S. Matthews
*Assistant Examiner*—Richard A. Wintercorn
*Attorney, Agent, or Firm*—Robert E. Burns; Emmanuel J. Lobato

[57] ABSTRACT

Apparatus for making color separation negatives comprises a photographic enlarger mounted on a light-tight casing. The enlarger comprises a film holder plate for receiving a color film, a lens system, a diaphragm and a shutter. A light source is provided above the film holder plate and means is provided for inserting interchangeable color filters between the light source and the film. A film holder table in the casing receives a single sheet of film large enough for four separation negatives and is movable so as to present the four quarters of the film sheet successively to the enlarger. The movement of the film holder table, the filter selection, the diaphragm opening and the shutter timing are all automatically controlled to make four separation negatives successively on the same film sheet. The exposure of the film can be modified by a timed exposure to an auxiliary light movable momentarily into position over the respective quarter of the film sheet.

22 Claims, 16 Drawing Figures

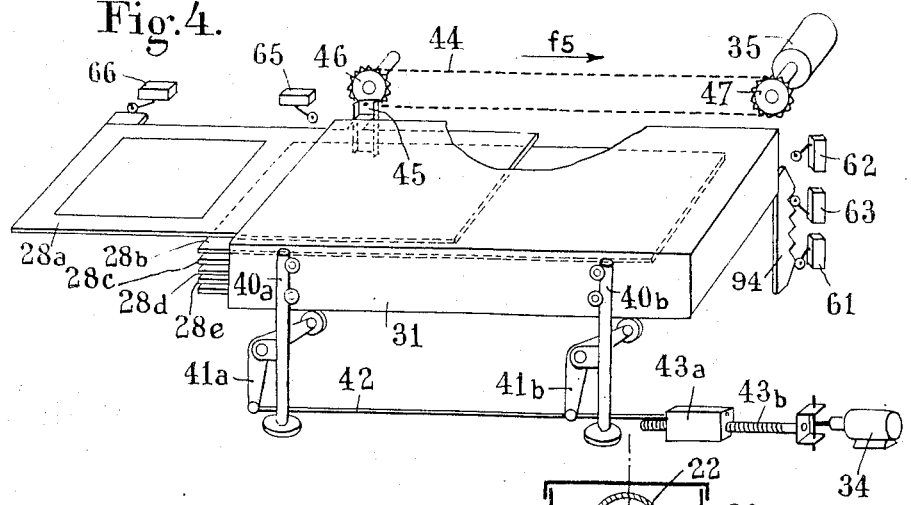
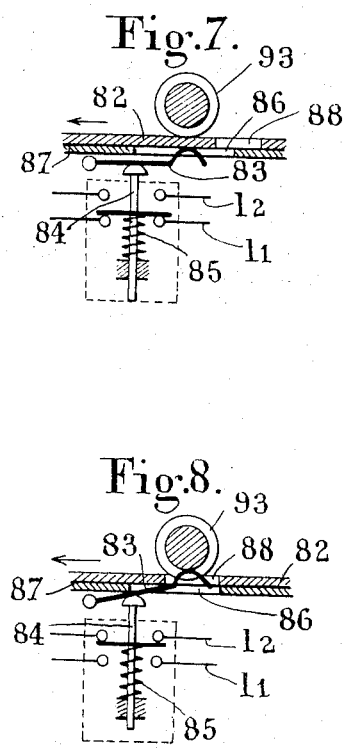
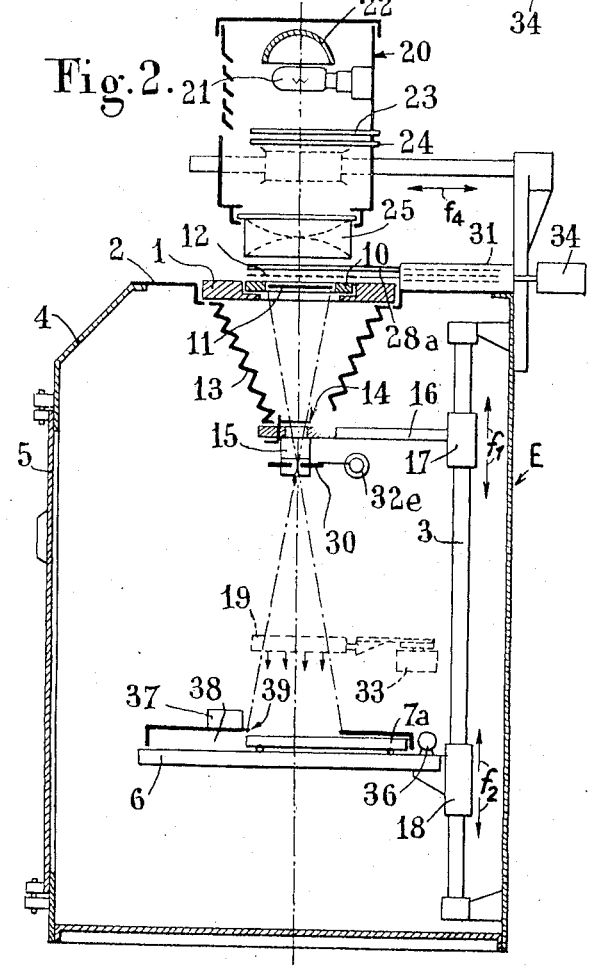

APPARATUS FOR AUTOMATIC HALF-TONE (DIRECT-SCREEN) OR CONTINUOUS TONE COLOUR SEPARATION WORK IN PHOTOMECHANICAL REPRODUCTION

This is a continuation in part of my application Ser. No. 887,087, filed Dec. 22, 1969, now abandoned.

BACKGROUND OF THE INVENTION

The present invention relates to an apparatus for the automatic half-tone (direct screen) or continuous tone color separation work in photomechanical reproduction, whereby separation negatives can be obtained from an original or transparency (color diapositive) for subsequent use in the preparation of photogravure negatives for making color prints.

The technical and economical difficulties arising in color photogravure result mainly from 1) the cascade method being employed therefor, 2) the separation negative corresponding to each color being processed separately, and 3) the originals or transparencies being grouped together for the production of separation negatives. This grouping is intended to speed up the process while keeping it within economical limits, but such a group of possibly very dissimilar originals can be processed as a whole only if admitting abnormally broad compromises on the processing conditions.

The so-called "Scanner" apparatus which are known in the art are suitable for the heliogravure process, but they are not adapted to other printing processes, notably in that they do not permit of bringing the image to the desired scale.

The so-called "half-tone" or "direct-screen" process, although providing satisfactory results, is disadvantageous in coupelling to take all the necessary decisions before commencing the work, as well as in prohibiting the grouping of dissimilar originals. However, this process is extremely advantageous inasmuch as the images thus obtained are very sharp, with well-distributed color values, and if carried out rapidly and skilfully it may prove quite economical. But this last process involves the use of an enlarger specially designed for this purpose and capable of being operated very rapidly since each original is reproduced separately.

Enlargers specially designed for the half-tone or direct-screen process are already known, but their diffusion has been hindered by their cost and over-all dimensions, and also by the large number of handlings they need.

SUMMARY OF THE INVENTION

A first object of the present invention is to provide an improved apparatus easily capable of automatically and economically producing separation negatives for printing purposes.

Another object of the present invention is to provide an apparatus which comprises an enlarger of particular design having a vertical column, an original or transparency holder plate receiving the original or transparency holder frame and disposed in a stationary relationship with the column, a film holder plate movable along the column, a light-tight casing enclosing, the column and the film holder plate and supporting the original holder plate, a door being provided in the wall of said casing for permitting the access to the film holder plate, a light box which is not light-tight and is independent of the original holder plate, the light-box being provided with ventilation apertures and being adapted to be moved by translation or rotation, a film holder table for supporting a film adapted to receive the four color separation images, the table being movable in two perpendicular directions on the film holder plate so that it can be moved to and locked in the four positions corresponding to the four images respectively, and means for automatically controlling the sequence of changes in color filters, of the luminations and of the movements of said film holder table which are necessary for performing a color separation operation.

A further object of the present invention is to provide an apparatus of the type concerned, which comprises motor means for controlling the movements of the color filters, and of the film holder table, as well as for controlling the opening and closing of the diaphragm associated with the lens system of the enlarger, and electronic timing devices for setting the exposure times. The motor means and electronic devices are responsive to automatic control means.

A still further object of the present invention is to provide an apparatus of the type concerned, which comprises automatic means consisting essentially of a programmer device of any suitable type, such as a punched-card programmer or equivalent recording means (such as magnetic tape, magnetic disc or the like) adapted to be stored for subsequent re-use.

The apparatus according to the present invention shows a number of advantageous features:

1) — As the original holder plate is stationary in relation to the enlarger's column and all parts of the apparatus which are beneath the original holder plate and which comprise the sensitive film are enclosed in a light-tight casing, the enlarger can be operated in broad daylight or under normal artificial light conditions except during the initial film-loading operation and during a possible intermediate step, consisting in removing the half-tone screen; thus, access to the original can be had under broad daylight condition when the apparatus is loaded, and the operator can change the corrector screen or mask, possibly disposed on the original in the original holder frame without being obliged to bring said frame into another illuminated room.

2) — As the light-box is movable so that access to the original holder frame may be had without extracting this frame from the original holder plate, it is possible to change the mask or screen covering the original in the original holder frame without interfering with this original, and therefore, without modifying or interfering with the optical setting or focusing while keeping to the same reference or registration marks.

3) — As the light-box is not required to be light-tight, it can be properly ventilated by means of apertures, louvres and fans, so that high-power light sources can be used, even releasing a considerable amount of heat, such as a quartz-bulb iodine lamp or a pulsated xenon lamp. Ventilation is extremely advantageous in that any detrimental overheating of the original and of the mask or screen associated therewith can be safely avoided. (It is well known in the art that this overheating is frequently attended by a distortion, interfering with the registration).

4) — The sequence of operations is specially easy and rapid inasmuch as the four color separation images are produced on a single film which is covered in the half-tone or direct-screen operation with four separate screens assembled by adhesive tapes and properly oriented in relation to one another to avoid undesired moire. The film and half-tone screens are supported by a table which is movable on the film holder plate of the enlarger, and is adapted to be locked in the four positions corresponding to the four images to be made. A programmer provides for automatically controlling the sequence of changes in colour-filters, of selected illuminations (main exposures with the different colour filters and auxiliary exposures with an automatically retractable, auxiliary light source having a uniform light-surface and disposed between the lens system and the film, exposures with a second screen or mask for the so-called "sub-colours removing operation," and possibly final exposure without half-tone screen, i.e., the so-called exposure for the "lights"-or brightest zones of the subject-which, for more convenience, is reserved for the last image) and of the movements of the film table holder.

5) — The simultaneous processing of the four images obtained on the single film ensures the proper balance between the respective values of the four negatives and permits of processing the film without resorting to an automatic developing machine.

6) — The punched cards or like recording means for the programmer device can be stored as a convenient memory material, which can be subsequently re-used for similar sequences of operations on originals to be reproduced under equivalent conditions.

These and other advantageous features of the apparatus according to this invention become obvious when considering that with conventional enlargers, all operations must be carried out in the maximum darkness. The operations comprise loading and unloading the enlarger with the film and screen (four times), and in the intervals between the successive exposure steps and developing separately the four separate negatives, there is a risk of obtaining a poor balance between the negative values if these operations are not performed with an automatic developing machine.

Compared with the presently available apparatus for making color-separation negatives, the apparatus according to this invention provides by itself all the advantages set forth hereinabove, notably in the preparation of negatives for printing purposes.

It would not constitute a departure from the scope of this invention to adapt to a known enlarger one or a plurality of the novel features or elements of the apparatus according to this invention, such as for example the movable film holder table and the automatic control means.

BRIEF DESCRIPTION OF THE DRAWING

A preferred embodiment of the apparatus according to the present invention will now be described more in detail with reference to the attached drawing in which:

FIG. 2 is a diagrammatic vertical section of the enlarger;

FIGS. 3 and 4 show details of the enlarger;

FIGS. 7 and 8 are cross sectional views taken on lines VII—VII and VIII—VIII, respectively, of FIG. 6;

DESCRIPTION OF THE PREFERRED EMBODIMENT.

Figure 1:
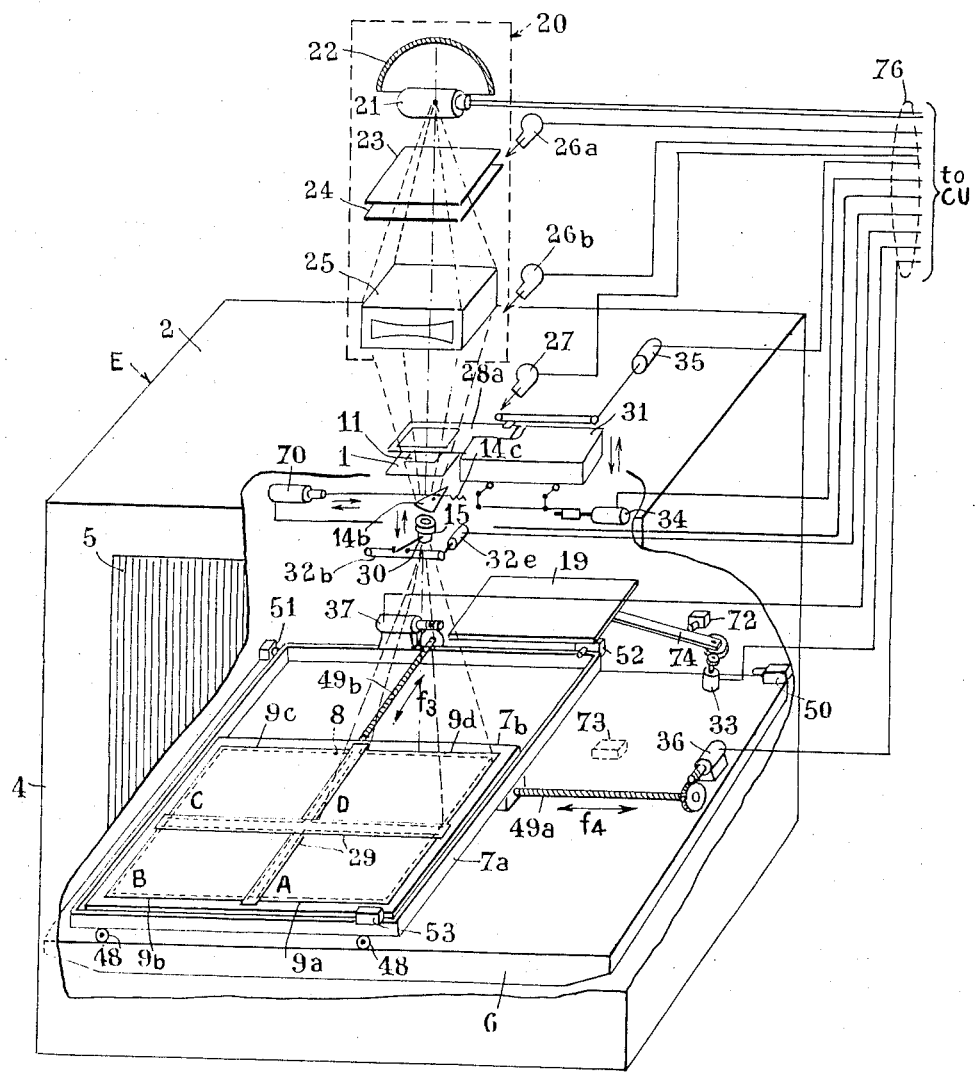
FIG. 1 is a diagrammatic illustration of the general structure of the enlarger.

The apparatus illustrated consists essentially of an enlarger E of particular design, which comprises an original holder plate 1 disposed in a horizontal plane in a stationary relationship with a vertical column 3 (not shown in FIG. 1). This plane is embodied by the upper wall 2 of a light-tight casing 4 which is provided with a door 5, permitting an easy access to a film holder plate 6. The holder plate is slidably mounted on column 3. A film holder system 7a, 7b, adapted to carry a film 8 and possibly half-tone screens 9a to 9d is disposed on the holder plate.

An original holder frame 10 is detachably housed in the original holder plate 1. A transparent original or diapositive 11 is placed on the holder frame and a corrector mask or screen 12 (see FIG. 2) is superposed in proper position on the original or diapositive.

The light-tight casing 4 of the enlarger comprises in conventional fashion a bellows 13 connected at its upper end to the original holder plate 1. (FIG. 2) at the lower end of the bellows, a shutter system 14, a lens system 15, and a diaphragm 30, the opening and closing of which are controlled by motor means 32e, are provided.

Figure 3:
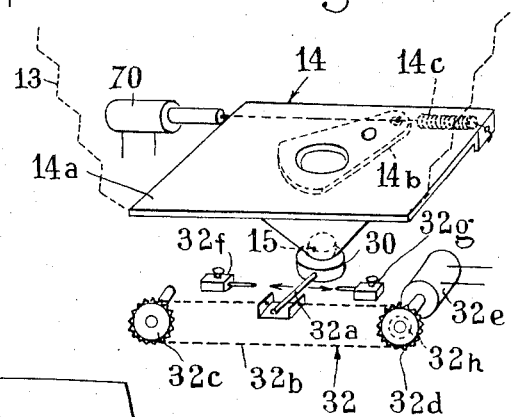

FIG. 3 shows at a larger scale the shutter system 14, comprising an apertured plate 14a on which a shutter 14b is pivotally mounted, an electromagnet 70 specially of the plunger type operative to pivot the shutter 14b to its opening position, and a coil spring 14c operative to bring back the shutter 14b to its closing position when the electromagnet 70 is de-energized. FIG. 3 shows also the control means 32 for the diaphragm 30, comprising a diaphragm control lever 32a, an endless chain 32b for moving the control lever 32a, chain wheels 32c and 32d for guiding the endless chain 32b, an electromotor 32e for driving the chain wheel 32d, adjustable stop means 32f, 32g for the pivoting control lever 32a, and a friction clutch 32h inserted between the respective axles of the chain wheel 32d and motor 32e, whereby the maximum diaphragm opening is dependent on the setting of the adjustable stop means and is independent of the operation time of the motor 32e. The base of the bellows 13 is vertically movable by means of an arm 16 and a slide 17 (FIG. 2) along the column 3 in the direction of the arrow $f_1$. The film holder plate 6 is also movable vertically along the column 3 by means of a slide 18 in the direction of the arrow $f_2$. These two movements are necessary for adjusting the enlarger and focusing the image.

The reference numeral 19 (FIGS. 1 and 2) designates an auxiliary light source specially of the electroluminescent type, which has a uniform light-surface and is automatically retractable. The source has a surface area slightly greater than that of a separation negative. This auxiliary light source, which is normally retracted as shown in FIG. 1, can be moved above the film 8 by means of a motor 33. It can then be made operative only when making an auxiliary exposure is intended in which case the shutter 14b is closed, or the main light source is turned off.

Overlying the upper wall 2 of the casing 4 is a light-box 20 enclosing a light source 21 (for example a pulsated xenon lamp), a reflector 22, heat-proof glass plates 23, one or a plurality of ground glass plates 24 for diffusing the light, and an optical condenser 25. This assembly is mounted within a box which, unlike conventional arrangements, is no more necessarily light-tight, and can thus be advantageously provided with ventilation holes, apertures or louvres, registering with fans or like air-blowing devices, such as the fan 26a disposed just above the heat-proof and ground glass plates 23, 24, and the fan 26b disposed near to the condenser 25. Another fan 27 is disposed near the bottom of the light-box, in the vicinity of a color filter 28a between the condenser 25 and the assembly comprising the mask or screen 12 and the original 11 housed in the original holder frame 10. The color filter 28a is carried by a filter-carrier casing 31 provided with a plurality of color filters. This carrier casing 31 is movable so that the various filters can be brought by turns in front of the original for making the various separation negatives. An electromotor 34 controls the selection of the proper filter in the carrier casing 31 and another electromotor 35 controls the insertion of the selected filter between the condenser 25 and the original holder frame 10.

FIG. 4 shows that the filter carrier casing 31 is vertically guided by four posts or rails such as 40a, 40b, and it is supported by two pairs of rockers, such as 41a, 41b. The free lower ends of the rockers are hinged on a linking rod 42 which is coupled to nut member 43a. The nut member engages a screw member 43b coupled to the axle of the electromotor 34. When this motor 34 is energized to rotate in a suitable direction, the rockers such as 40a, 40b progressively lift the carrier casing 31, whereby the five color filters 28a to 28e enclosed in the casing 31 are successively brought at the level of an insertion device. This insertion device comprises an endless chain 44, a filter gripping member 45 engaging the selected filter (28 a in FIG. 4) through the open rear face of the casing 31, chain wheels 46, 47 for guiding the endless chain 44, and the electromotor 35, the axle of which is rigidly coupled to that of the chain wheel 47. When the motor 35 is energized to rotate in a suitable direction, the endless chain 44 drives the gripping member 45 so that this member pushes the selected filter out of the casing 31, then draws it back to the inside of the said casing 31.

FIG. 1 shows a film holder table 7b, which may be of the well known vacuum type, and which supports the single film 8 adapted to receive the four views of the colour separation, as well as the four corresponding half-tone screens 9a to 9d, disposed with different orientations when operating according to the half-tone or direct-screen process. The four screens 9a to 9d are assembled along their inner marginal portions for example by using adhesive tapes 29.

The film holder table 7b is movable, for instance by means of rollers (not visible) in the direction indicated by arrow $f_3$, on the bottom plate of a tray 7a. Tray 7a is also movable by means of rollers such as 48 in the direction indicated by arrow $f_4$ perpendicular to $f_3$ on the upper face of the film holder plate 6.

The movable tray 7a is moved by an electromotor 36, which is mounted on the film holder plate 6, through a suitable transmission comprising a worm 49a. The movable table 7b is moved by an electromotor 37, which is mounted on the tray 7a, through a suitable transmission comprising a worm 49b.

The electromotors 36, 37 are selectively energized to make them rotate in respective suitable directions to bring successively the four quarters A, B, C, D of the film 8 placed on the table 7b, into registration with the optical field of the lens system 15 (quarter D of the film 8 is in the said field in FIG. 1), in the case four color selection images are to be taken on the single film 8.

The film holder table 7b is movable beneath a mask 38 (see FIG. 2) formed with a window 39 for limiting the exposed surface area of film 8, in each operative position of the said table 7b, to that of the separation negative to be obtained.

According to this invention, the light box 20 is advantageously adjustable either by translation as shown in FIG. 2 by the arrow $f_4$, or by rotation, to permit the access to the underlying original holder frame 10 and also for changing the mask 12 without interfering with the original 11.

Figure 5:
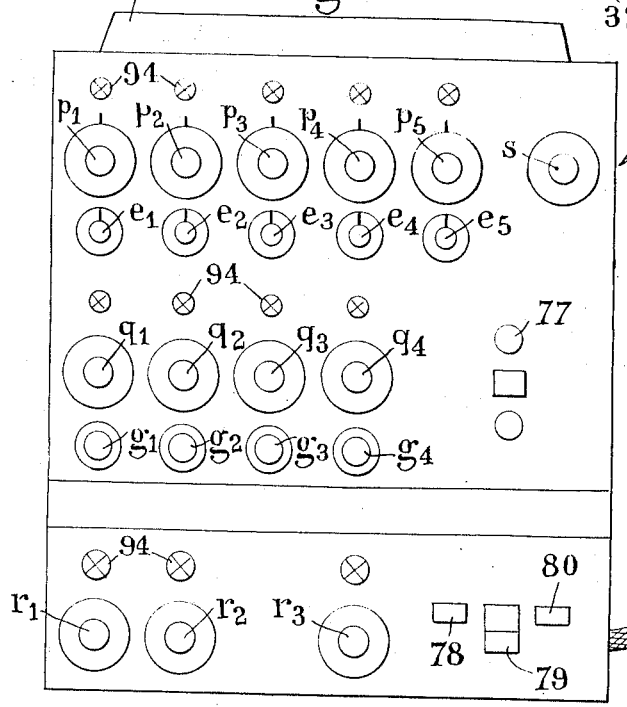
FIG. 5 is a front view of the control unit.

As shown in FIGS. 1 and 5 of the drawings, the enlarger E and control unit CU are interconnected through a multiple conductor cable 76 linking the component elements 21, 26a, 26b, 27, 35, 34, 70, 32e, 37, 33 and 36 of the enlarger E to the various circuit means of control unit CU to be described presently. For the time being it is only necessary to mention that the front panel of control unit CU, as shown in FIG. 5, comprises a number of adjustment knobs, to be described later in detail, a pilot light 77 showing that the control unit is energized, a general switch 78 for controlling this energization, a switch 79 for selecting the illuminating power of the light source 21 and another switch 80 for putting out the light in the room where the apparatus is located, when the enlarger E has to be loaded and unloaded. All of these components are shown only diagrammatically, without their electrical connections, but they are well known in the art and therefore a detailed description thereof is not deemed necessary for the purpose of this invention.

Figure 6:
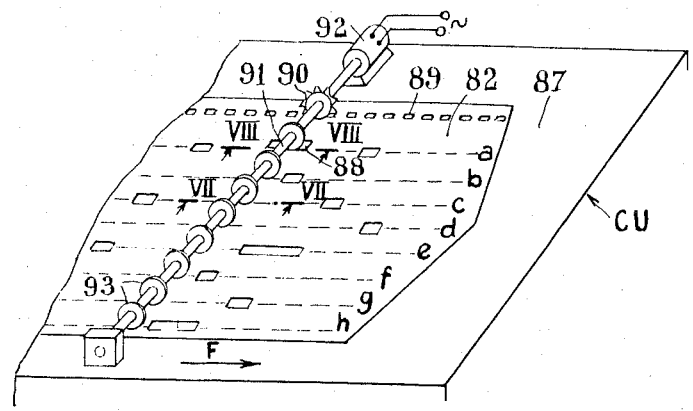
FIG. 6 shows the upper part of the control unit.

At the upper portion of the control unit CU, and protected by a cover 81 (in position in FIG. 5 but removed in FIG. 6), there is a punched-card reading device (FIG. 6) comprising in a well known manner pressure-responsive switches associated with the various tracks a to h respectively, of a punched card 82. Each pressure-responsive switch comprises for example (see FIGS. 7 and 8) a pivoted arm 83 formed with a rounded head normally urged by a push member 84, responsive to a compression coil spring 85, against the back face of card 82, through a suitable slot 86 formed in the top wall 87 of the control unit case. FIGS. 7 and 8 illustrate clearly how the passage of a perforation 88 of card 82 above the rounded head of pivoted arm 83 results in a well known manner in the opening or breaking of a circuit line $l_1$ and in the simultaneous closing or making of another circuit line $l_2$. Of course, the card 82 may be of another known type and comprise for example perforated conducting tracks co-acting with conducting brushes or sliding contacts. One edge of card 82 comprises a row of small perforations 89 engaged by a sprocket wheel 90 keyed to a transverse shaft 91 which is driven from an electric motor 92 through a suitable reduction gearing for feeding the card in the direction of the arrow F (FIG. 6). Moreover the punched card 82 is pressed against the top surface of the top wall 87 of control unit case CU by rollers 93 rigid with transverse shaft 91. Of course, any known type of punched card reading system may be associated without difficulty with the control unit of the apparatus of this invention. Similarly, the number of tracks contemplated in punched card 82 may be greater than that shown in FIG. 5 so as to meet specific requirements of the control unit as will be explained hereinafter. In FIGS. 9 to 15 inclusive the reference letter $c$ with different numerical exponents is used for designating switches of the reading system of control unit CU, which are of the type illustrated in FIGS. 7 and 8. These switches are normally open but are closed only during the passage of a perforation of the relevant track above the respective switch.

Now reference will be made to FIGS. 9 to 15 inclusive for describing the various circuit means incorporated in said control unit CU.

Figure 9:
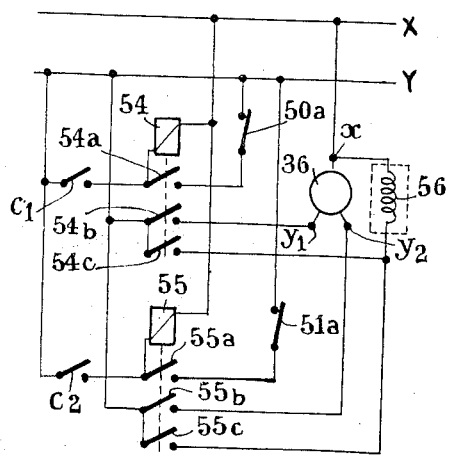
FIGS. 9 to 16 show electric circuits included in the control unit.
Figure 10:
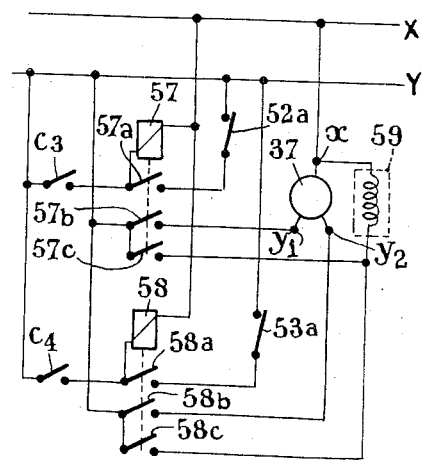

FIGS. 9 and 10 illustrate the control circuits of electric motors 36 and 37 (FIG. 1) which respectively drive the film holder tray 7a from right to left and vice-versa, and the film holder table 7b from front to rear and vice-versa, in order to bring successively the four quarter areas A, B, C and D of film 8 into the optical field of the lens system 15. These two electric motors 36 and 37 (FIGS. 9 and 10) are of the three terminal type, with one terminal $x$ connected permanently to one of the pair of conductors X-Y of the mains or like current supply line, either one of two other terminals, $y_1$ and $y_2$, being adapted to be connected to the other conductor Y of said mains or like current supply line according to the direction in which the relevant motor 36 or 37 is to be rotated. Associated with each motor 36, 37 is an electromagnetic brake system 56 or 59, respectively, which is normally applied, and released only in the energized condition of the corresponding motor. Each one of the two control circuits illustrated in FIGS. 9 and 10 further comprises a pair of electromagnetic relays 54, 55 or 57, 58, each comprising three work contacts, and also rest contacts 50a, 51a (FIG. 9) or 52a, 53a (FIG. 10), incorporated in limit switches 50, 51 respectively (see FIG. 1) of film holder tray 7a and limit switches 52, 53 (FIG. 1) of film holder table 7b.

The switching actions taking place when controlling for instance the movement of film holder tray 7a from its left-hand position shown in FIG. 1, in which it actuates the limit switch 51, to its right-hand position, in which it actuates the other limit switch 50, will be described briefly. This movement occurs when the film holder tray 7a, after the first negative has been taken on quarter A of film 8, is moved to position its adjacent quarter B in the field of the lens system 15 for taking the second negative. The movement of a perforation of the corresponding track of punched card 82 (FIG. 6) past its switch control arm 83 (FIGS. 7 and 8) closes contact $c_1$ (FIG. 9) and thus the winding of relay 54 is energized temporarily. Since the limit switch 50a is closed in its rest position, when contact $c_1$ re-opens the energization of relay 54 is maintained due to the closing of its work contact 54a. The simultaneous closing of its other two work contacts 54b and 54c results in the energization of motor 36 through its terminal $y_1$ and also of brake 56. Thus, the brake 56 is released and the motor 36 is started in the direction to move the film holder tray 7a from left to right. When the corresponding edge of tray 7a actuates the other limit switch 50 (FIG. 1), the opening of its rest contact 50a de-energizes the relay coil 54 so that all the contacts of this relay are opened and the motor 36 is de-energized while its brake 56 is applied.

It is not deemed necessary to describe similarly in detail the switching actions obtaining in the control circuits illustrated in FIGS. 9 and 10, respectively, for moving the film holder tray 7a from right to left and film holder table 7b in relation to said film holder tray 7a, for anybody skilled in the art will readily understand this mode of operation from the above detailed explanation.

Figure 11:
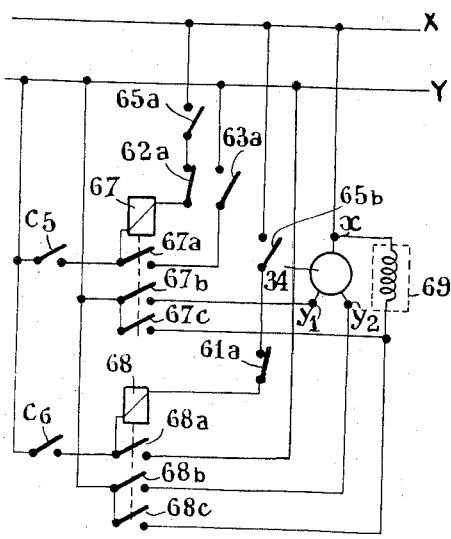
Figure 12:
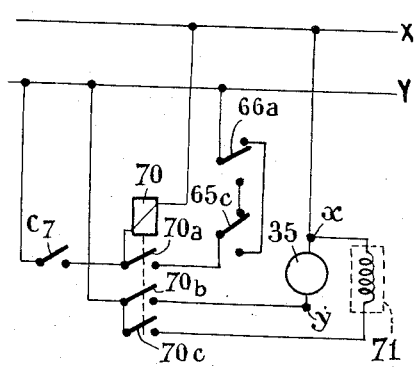

FIGS. 11 and 12 illustrate the control circuits of electric motors 34 and 35 respectively (see FIGS. 1 and 4) that produce the upward and downward movements of the filter casing 31 and the movements of the filters proper into and out of said casing 31. Whereas the motor 34 has three terminals so that it can be controlled for rotation in either direction, the other motor 35 comprises only two terminals and therefore rotates constantly in the same direction, so that the endless chain 44 is constantly driven in the same direction $f_5$ (FIG. 4). The filter gripping member 45 is adapted to move the filter (28a in FIG. 4) from right to left when the corresponding span of endless chain 44 is the lower span (as in the case illustrated in FIG. 4), and to move said filter from left to right when the chain span carrying said filter gripping member 45 is the upper span. In addition to electromagnetic brakes 69 and 71, of the type already mentioned hereinabove, the circuit of FIG. 11 comprises the former a pair of electromagnetic relays 67 and 68 and the circuit of FIG. 12 comprises a single electromagnetic relay 70, each of said relays comprising three work contacts. Finally, the circuit of FIG. 11 comprises a rest contact 61a of a lower limit switch 61 (FIG. 4), a work contact 63a of a switch 63 for signalling the momentary position of the filter casing 31, and a pair of work contacts 65a, 65b of a switch 65 signalling that the filter (28a in FIG. 4) moved by the filter gripping member 45 has been brought back into the filter casing 31. A clearly shown in FIG. 4, the switches 61, 62 and 63 are actuated through a notched cam 94 disposed vertically and secured to the filter casing 31 so that said switches 61 and 62 are actuated when sid casing 31 is in its lowermost and uppermost positions, respectively, while switch 63 ceases to be operated by said notched cam 94 only when one of the filters 28a to 28e is exactly level with the filter gripping member 45. The circuit illustrated in FIG. 12 further comprises a reversing contact 65c also incorporated in switch 65 (FIG. 4). The reversing contact 65c is in the position shown in FIG. 12 when, as the filter has been partly extracted from casing 31, the switch 65 is no longer operated. There is also a reversing contact 66a of another switch 66 (FIG. 4), which is in the position shown in FIG. 12 when the corresponding filter, for instance filter 28a, is partly extracted from casing 31 as shown in FIG. 4.

When the filter casing 31 is for example in its lowermost position, in which the topmost filter 28a is level with filter gripping member 45 and the switch 62 is not actuated, and when the filter 28a has been partly extracted from casing 31 as illustrated in FIG. 4 and switch 66 is actuated, the closing of contact $c_7$ as one perforation 86 of the corresponding track of punched card 82 (FIG. 6) receives the rounded head of the corresponding pivoted arm 83 (FIG 8) causes the temporary energization of the coil of relay 70 (FIG. 12). This energization is subsequently maintained through its work contact 70a, since the reversing contact 65c is in its rest position illustrated in the FIG. 12 while the other reversing contact 66a is in its position other than that illustrated in FIG. 12. Thus, closing of the work contacts 70b and 70c of relay 70 will energize and start the motor 35 and energize brake 71, the latter being thus released so that the endless chain 44 is driven in the direction of the arrow $f_5$ (FIG. 4) and re-introduces the filter 28a into casing 31 by means of the filter gripping member 45 which has passed over the sprocket wheel 46. When the filter 28a thus driven by member 45 has resumed its inoperative position in casing 31, the limit switch 65 is actuated and its reversing contact 65c is moved to its position other than that shown, so as to open the energizing circuit of relay 70. As this relay 70 drops back, the motor 35 and brake 71 are no longer energized. As contact $c_5$ is subsequently closed due to the passage of a punched card perforation, the energizing circuit of electromagnetic relay 67 (through rest contact 62a of switch 62 and the then closed work contact 65a of switch 65) is closed temporarily. The energization of the coil of relay 67 is then maintained by the contacts 62a and 65a, and also through the work contact 67a of the same relay 67 and work contact 63a of switch 63, which was actuated immediately as the closing of contact 67b of relay 67 had energized the motor 34 and caused this motor to rotate in the proper direction for causing the rockers 41a and 41b to move the filter casing 31 upwards. This energizing circuit of relay 67 is maintained, and therefore the motor 34 continues to rotate in the aforesaid direction, and the brake 69 is still released, until the second filter 28b is level with the filter gripping member 45, from which the first filter 28a has just been released. At this time the switch 63 is released and the energizing circuit of relay 67 is open as a consequence of the opening of its work contact 63a, so that both motor 34 and brake 69 are de-energized. The next closing of contact $c_7$ (FIG. 12) results again in the energization of the coil of relay 70, of which the work contact 70a closes the holding circuit through reversing contacts 65c and 66a, the first contact 65c being in its position other than that illustrated in FIG. 12. Then the motor 35 causes, through the endless chain 44 and filter gripping member 45, the next filter 28b to move out from casing 31. Switching actions similar to those described hereinabove then cause the second filter 28b to move back into casing 31, the upward movement of this casing, the outward movement of the third filter 28c, and so forth, until the last filter 28e has been extracted from, and then reintroduced into, the casing 31. Thereafter the closing of contact $c_6$ (FIG. 11) due to the passage of a perforation of punched card 82, causes the coil of relay 68 to be energized temporarily through rest contact 61a of the lower limit switch 61 (FIG. 4), which then is not operated, and work contact 65b of switch 65, which then is operated since filter 28e has been re-introduced into casing 31. The closing of work contacts 68a, 68b and 68c of relay 68 then keeps this relay energized and therefore causes the energization of brake 69, and of motor 34 through its terminal $y_2$, whereby the motor 34 rotates in the direction to cause the rockers 41a, 41b to permit the downward movement of the filter casing 31 by gravity, until the casing 31 has resumed its lowermost position, illustrated in FIG. 4. The actuation of switch 61 thereupon results, due to the opening of its rest contact 61a, in the opening of the holding circuit of the coil of relay 68.

Figure 13:
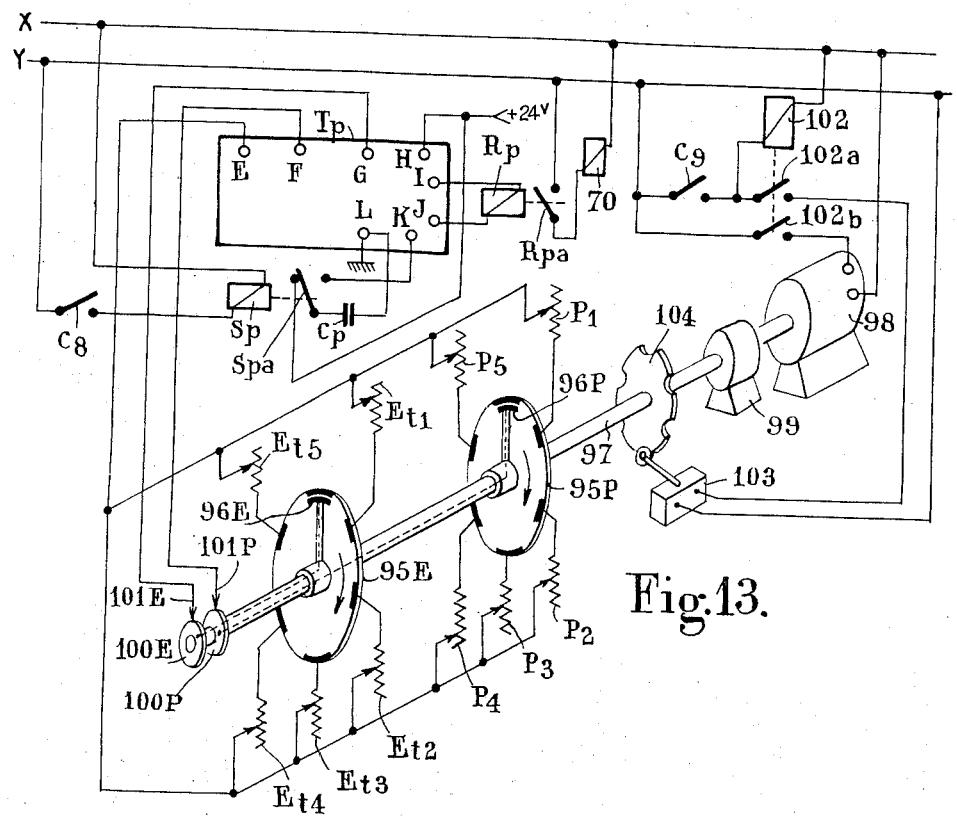

FIG. 13 illustrates the circuit of control unit CU for adjusting separately the durations of the main exposures. The main component of this circuit is a timer circuit $T_p$, of which different embodiments may be contemplated for the purpose of this invention. In FIG. 13 as well as in FIGS. 14 and 15 a timer circuit of this type is shown as a "black box" having eight terminals. Two output terminals I, J deliver a current or voltage pulse, which is fed to the coil of an electromagnetic relay $R_p$ and has a duration adjustable within certain suitable limits, by adjusting a first variable resistor connected across terminals E and F. The magnitude of this duration adjustment may be modified, for example by plus or minus 50 percent, through the adjustment of a second variable resistor connected across terminals E and G. Terminal K is intended for starting the timer circuit $T_p$ by an electric pulse, which, in the example illustrated is delivered thereto by discharging a capacitor $C_p$. The energization of the timer circuit $T_p$, for example with 24-Volt direct current, is obtained through supply terminals H and L. A work contact $R_{pa}$ of relay $R_p$ is inserted in the energizing circuit (from the mains or like supply line X-Y) of the coil of electromagnet 70 (FIG. 3), controlling the opening of shutter 14b. The 24-Volt charging of capacitor $C_p$ is obtained in the rest position of a reversing contact $S_{pa}$ of a relay $S_p$.

To permit the operation of the same timer circuit $T_p$ for obtaining the four color separation negatives with exposure times respectively consistent with the negatives, so that their respective exposure times may possibly differ from one another, there are provided, for the five possible separation colors (yellow, red, black first blue, second blue), five separate adjusting potentiometers $P_1$ to $P_5$, and five correcting or re-calibrating potentiometers $Et_1$ to $Et_5$, the sliding-contact control knobs of which are designated by the symbols $p_1$ to $p_5$ and $e_1$ to $e_5$, respectively, in FIG. 5. The reference numeral 94 in FIG. 5 designates corresponding colored pilot lights, each of which is switched on when the potentiometer associated thereto is in operation. This is obtained by using well known and conventional means, of which the description is not deemed to be necessary for a proper understanding of this invention. As clearly shown in FIG. 13, all the sliding contacts of potentiometers $P_1$ to $P_5$ and $Et_1$ to $Et_5$ are connected in common to the terminal E of timer circuit $T_p$, their other terminals being respectively connected to five stationary contact studs of rotary switches $95_p$ and $95_E$, each comprising a sixth stationary contact stud for the inoperative position and conducting brushes or sliding contacts $96_p$ and $96_E$ which are rigid with a common shaft 97, adapted to be rotatably driven from an electric motor 98 through a suitable reduction gearing 99. A pair of conducting slip rings 100P and 100E are rigidly mounted on shaft 97, so as to be electrically insulated therefrom and to be electrically connected to brushes 96P and 96E, respectively, through suitable conductors. A pair of fixed brushes 101P and 101 E, sliding on the outer periphery of rings 100P and 100E, are connected to terminals F and G, respectively, of timer circuit $T_p$. The energizing circuit of electric motor 98 (from the mains or like supply line X-Y) comprises a work contact 102b of a relay 102, having a holding circuit comprising a work contact 102a of the relay 102, and also a work contact of a switch 103 operated by a cam 104 which is keyed on shaft 97 and is formed on its peripheral edge with six notches disposed at spaced intervals and engageable by the contact arm of switch 103, the notches corresponding angularly to the six stationary contact studs of each of said pair of rotary switches 95P and 95E.

The main exposure control circuit illustrated in FIG. 13 operates as follows. The selected color filters being for example the yellow, red, black and first blue ones, the aforesaid potentiometers $P_1$ to $P_4$ are first set by means of their control knobs $p_1$ to $p_4$ (FIG 5) in accordance with the results obtained by a preliminary analysis of the original (11 in FIGS. 1 and 2), and also with the specific requirements of the printing process for which color selection negatives are to be obtained. The setting and the purpose of correcting potentiometers $E_{t1}$ to $E_{t4}$ will be explained hereinafter. Before the machine is started, brushes 96P and 96E of both rotary switches 95P and 95E are in their inoperative positions as shown in FIG. 13. When contact $c_9$ is closed as a consequence of the passage of a perforation of punched card 82 (FIG. 6), the coil of relay 102 is energized temporarily and, through the work contact 102b of this relay, the motor 98 is also energized so as to drive the shaft 97 and therefore cam 104, whereby the work contact of switch 103 is closed. Under these conditions, this work contact of switch 103 in conjunction with the work contact 102a of relay 102 closes the holding circuit of this relay until the rotational movement imparted by motor 98 to shaft 97 causes the second notch of cam 104 to be engaged by the follower arm of switch 103, and thus again breaks the holding circuit of relay 102. The brushes 96P and 96E of rotary switches 95P and 95E then contact their respective stationary contact studs which are connected to potentiometers $P_1$ and $E_{t1}$, respectively, so that these potentiometers $P_1$ and $Et_1$ are connected to terminals E-F and E-G of timer circuit $T_p$. Moreover the motor 98 is de-energized and the rotation of shaft 97 is stopped. When contact $c_8$ is closed temporarily, due also to the passage of a perforation of the corresponding track of punched card 82 (FIG. 6), the energizing circuit of relay $S_p$ is closed so as to switch on briefly its contact $S_{pa}$ and cause the charge of capacitor $C_p$ to be fed to the terminal K of timer circuit $T_p$. Thus, an electric pulse is produced across the output terminals I-J of timer circuit $T_p$ to energize the coil of relay $R_p$ so that its work contact $R_{pa}$ delivers energizing current to the coil of electro-magnet 70 controlling the opening of shutter 14b (FIG. 3). The duration of the corresponding main exposure (notably through the yellow filter previously moved to its operative position in the optical field of the lens system, in the manner described above) is determined by the values to which the potentiometers $P_1$ and $E_{t1}$ were adjusted initially. The end of this exposure time is coincident with, and determined by, the end of the pulse produced across the output terminals I-J of timer circuit $T_p$, and it controls the release of relay $R_p$ as well as the de-energization of electromagnet 70, the shutter 14b being returned automatically to its closed position by spring 14c (FIG. 3). The next closing movements of contacts $c_9$ and $c_8$ also corresponding to the passage perforations of punched card 82, result in the substitution, across the terminals E, F and G of timer circuit $T_p$, of potentiometers $P_2$ and $Et_2$ for the preceding ones $P_1$ and $Et_1$, and also in the starting of timer circuit $T_p$ for the main exposure through the second separation filter, for example the red filter, with an exposure time depending on the values to which said potentiometers $P_2$ and $Et_2$ have been adjusted. THe process is repeated for the main exposure of the third separation negative and then, finally, of the fourth separation negative.

Figure 14:
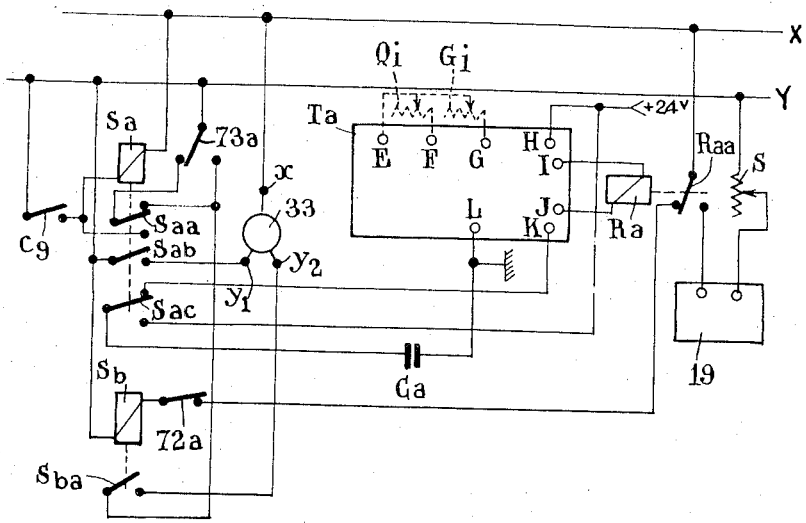

FIG. 14 illustrates the control circuit for the auxiliary exposures which are possibly carried out in producing at least some of the color separation negatives. This circuit comprises essentially a timer circuit $T_a$ having for example the same structure as that of timer circuit $T_p$ provided for the main exposures (FIG. 13); the durations of the auxiliary exposures corresponding to the separation of the four colors (yellow, red, black and first blue in this example) are preset by adjusting four adjusting potentiometers and four correcting or re-calibrating potentiometers, of which the adjusting knobs are designated by symbols $q_1$ to $q_4$ and $g_1$ to $g_4$, respectively, in FIG. 5. In FIG. 14, a single potentiometer $Q_i$ and a single potentiometer $G_i$ are shown, only in dash lines, between terminals E, F and G of timer circuit $T_a$, but actually the auxiliary exposure control circuit comprises not only four adjusting potentiometers and four correcting potentiometers, as just disclosed, but in addition a device permitting the switching these potentiometers to the input terminals E, F and G of timer circuit $T_a$, this switching device being for example of the type illustrated in FIG. 13 and already described hereinabove. $R_a$ designates a relay having its coil connected across the output terminals I-J of timer circuit $T_a$ and comprising a reversing contact $R_{aa}$, which, in its work position, connects the auxiliary light source 19 (FIGS. 1 and 2) to the mains of like supply line X-Y. Timer circuit $T_a$ is started by connecting its terminal K to one of the plates of a capacitor $C_a$, previously charged with 24-Volt current, the necessary switching being obtained through a reversing contact $S_{ac}$ of a relay $S_a$, further comprising another reversing contact $S_{aa}$ and a work contact $S_{ab}$ adapted, when closed, to connect to the mains conductor Y the terminal $y_1$ reversible electric motor 33 (see also FIGS. 1 and 2). The motor terminal $y_2$ may be connected to the mains line Y through a work contact $S_{ba}$ of another relay $S_b$ and also through the reversing contact 73a, in the work position thereof, of a limit switch 73 (FIG. 1) responsive to an arm 74 supporting the auxiliary light source 19 when the arm 74 has brought this light source 19 over the quarter area of film 8 lying in the optical field of the lens system 15. The energizing circuit of the coil of relay $S_b$ also includes the reversing contact $R_{aa}$ (in its rest position) of relay $R_a$, and likewise the rest contact 72a of another limit switch 72 (FIG. 1) actuated by the arm 74, supporting the auxiliary source 19, when this source is in the retracted or inoperative position as shown in FIG. 1.

The circuit of FIG. 14 operates as follows. In case an auxiliary exposure is contemplated for a given separation negative, with an exposure time preset by means of the corresponding potentiometers $Q_i$ and $G_i$, the passage of a punched card perforation (FIG. 6) results in the temporary closing of contact $c_9$ (FIG. 14) and therefore in the temporary energization of the coil of relay $S_a$. The reversing contact $S_{aa}$, of relay $S_a$, as it assumes its work position, closes a holding circuit comprising contact 73a, then in its rest position shown in FIG. 14, since, the auxiliary light source 19 being in its retracted position, switch 73 is not operated. The closing of work contact $S_{ab}$ of relay $S_a$ causes the energization of motor 33 through its terminal $y_1$, so that the motor 33 rotates in the direction to cause the arm 74 (FIG. 1) to move the auxiliary light source 19 from its retracted position to an operative position above the film quarter lying in the optical field of the lens system 15. When this auxiliary light source 19 has reached its operative position, its arm 74 actuates switch 73, the reversing contact 73a, of which by moving to its work position, opens the holding circuit of relay $S_a$ and causes the latter to drop. The contact $S_{ac}$ which, in its work position, had connected the capacitor $C_a$ to the 24-Volt d.c. source, now resumes its rest position and connects the capacitor $C_a$ across the terminals L and K of auxiliary timer circuit $T_a$, whereby this timer $T_a$ is started by the discharge of the capacitor $C_a$. As the relay coil $R_a$ is energized, its reversing contact $R_{aa}$ closes the circuit of the auxiliary light source 19 which begins to illuminate the quarter area of film 8 underlying the light source 19. At the end of the auxiliary exposure time preset by means of the corresponding potentiometers $Q_i$ and $G_i$, the return of the contact $R_{aa}$ of relay $R_a$ to its rest position results in the energization of the coil of relay $S_b$ through rest contact 72a of switch 72 (FIG. 1), which has not been actuated so far. The closing of work contact $S_{ba}$ of relay $S_b$ connects the terminal $y_2$ of motor 33 to the mains conductor Y through reversing contact 73a, directly as long as switch 73 is actuated by arm 74, and in series with reversing contact $S_{aa}$ of relay $S_a$ (then in its rest position) when the switch 73 is no longer actuated by arm 74 due to the rotation of motor 33. When the arm 74 has brought the auxiliary light source 19 back to its retracted or inoperative position (FIG. 1), it actuates switch 72, of which the rest contact 72a opens the energizing circuit of relay $S_b$ and stops the motor 33. A potentiometer S having a control knob s (FIG. 5) is provided for regulating in a well known manner the intensity of the auxiliary light source 19.

Figure 15:
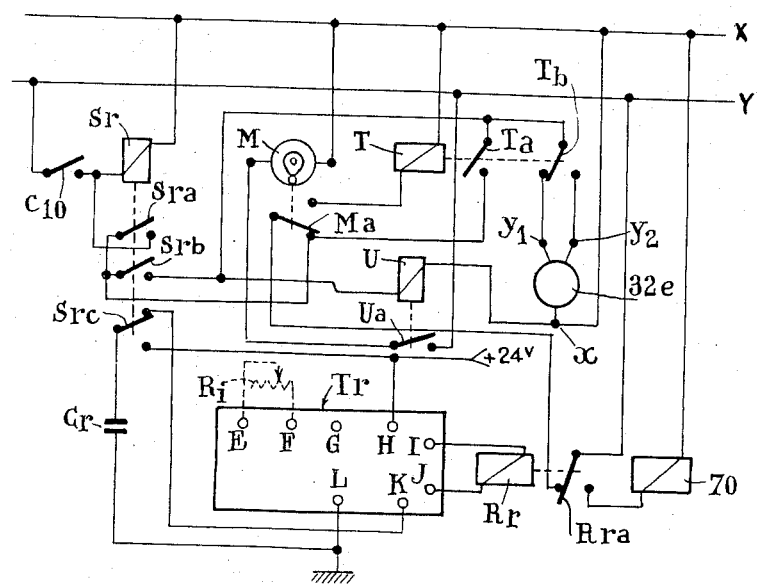

FIG. 15 illustrates the circuit provided for controlling the so-called "sub-colors removing operation," which may be required to be carried out for at least some of the separation negatives, subsequent to the main exposure and possibly to the auxiliary exposure. This operation ("sub-colors removal") is to be performed with a special mask, obtained in manner known in the art, disposed on the original. Therefore, the circuit of FIG. 15 will control automatically all the steps of the sub-colors removing operation, which take place from the laying of the special mask to the removal thereof, which are compulsorily performed manually. The circuit of FIG. 15 comprises a timer circuit $T_r$ having essentially the same general structure as the timer circuits $T_p$ and $T_a$ described hereinabove in connection with FIGS. 13 and 14, respectively. In addition thereto the circuit comprises a relay $R_r$, a reversing contact $R_{ra}$ of which is adapted in its work position to connect the electromagnet 70 of FIGS. 1 and 3 to the mains X-Y; another relay $S_r$ having a reversing contact $S_{rc}$ adapted, when it comes to its rest position, to switch the plates of a capacitor $C_r$ from the terminals of the 24-Volt d.c. source to the terminals K and L of timer circuit $T_r$; a pulse relay T of the bistable type, comprising a reversing contact $T_b$ having its two stationary contact studs connected to the pair of terminals $y_1$, $y_2$ of electric motor 32e (FIG. 3) for controlling the opening and closing of diaphragm 30; an electric timing device comprising for example a motor M driving a cam having a single boss, which, once per revolution, temporarily switches a reversing contact $M_a$ in order to deliver a current pulse to the coil of said bistable relay T, and a relay U, of which the energizing circuit is adapted to be closed by a work contact $S_{rb}$ of relay $S_r$, and comprising a work contact $U_a$ inserted in the energizing circuit of said timing device motor M from the mains line X-Y.

The control circuit of FIG. 15 operates as follows. The temporary closing of contact $c_{10}$, due to the passage of a perforation of the corresponding track of punched card 82 (FIG. 6) causes the coil of relay $S_r$ to be energized temporarily, this energization being subsequently maintained through the following circuit:

1) X, $S_r$, $S_{ra}$, $M_a$, $R_{ra}$, Y.

Thus, the coil of relay U is energized through the following circuit:

2) X, x, U, $S_{rb}$, $M_a$, $R_{ra}$, Y.

The closing of the work contact $U_a$ of relay U results in the energization of timing device motor M, the cam begins to rotate from the position attained thereby just after the previous brief actuation of reversing contact $M_a$. As contacts $T_a$ and $T_b$ of bistable relay T are initially in the positions shown in FIG. 15, the motor 32e is energized through its terminal $y_1$ in parallel with the coil of relay U through the reversing contact $T_b$. The motor 32e then rotates in a direction such that the means illustrated in FIG. 3 gradually opens the diaphragm 30 by actuating its control lever 32a. The opening movement of this lever is stopped for example by adjustable stop means 32f, the motor 32e continuing nevertheless to rotate without driving the endless chain 32b due to the slipping of friction clutch 32h. When the cam of timing device motor M has accomplished a complete revolution, it switches briefly the reversing contact $M_a$ in order to energize temporarily the coil of bistable relay T through the following circuit:

3) X, T, $M_a$, $R_{ra}$, Y, thus closing the contact $T_a$ of bistable relay T and reversing its contact $T_b$. Since on the other hand the above-defined circuits 1) and 2) are each broken temporarily by the reversing contact $M_a$, both relays $S_r$ and U are dropped, whereby the timing device motor M and motor 32e are de-energized and stopped. The return of contact $S_{rc}$ of relay $S_r$ to its rest position results in the connection of capacitor $C_r$, previously charged with 24-Volt current, across the terminals K and L of timer circuit $T_r$, which is thus started. Relay $R_r$ is energized and thus the reversal of its contact $R_{ra}$ causes current to be supplied to the coil of electromagnet 70, so that the latter controls the opening of shutter 14b (FIG. 3). This shutter 14b remains open during an exposure time preset through the adjustment of potentiometer $R_i$ connected across the terminals E and F of timer $T_r$. In the considered embodiment, the sub-colors removal is contemplated for only three negative colors, i.e., yellow, red and first blue, so that the circuit of FIG. 15 actually comprises three potentiometers such as $R_i$, of which the control knobs $r_1$, $r_2$ and $r_3$ are visible in the lower portion of FIG. 5, and also means for switching these three potentiometers to terminals E-F of timer circuit $T_r$, specially as illustrated in FIG. 13. At the end of the thus preset time period, i.e., at the end of the voltage or current pulse delivered to the coil of relay $R_r$, its reversing contact $R_{ra}$, while returning to its rest position shown in FIG. 15, opens the energizing circuit of electromagnet 70, whereby shutter 14b (FIG. 3) is re-closed immediately by the return spring 14c. Since the reversing contact $M_a$ of the timing device is again positioned as shown in FIG. 15, the coil of relay U is energized through the following circuit :

4) X, x, U, $T_a$, $M_a$, $R_{ra}$, Y, whereby its work contact $U_a$ supplies energizing current to motor M of the timing device, which begins to rotate. At the same time, the motor 32e is energized through its terminals $x$-$y_2$ in parallel with relay U via the contact $T_b$ of bistable relay T. The motor 32e will thus drive the endless chain 32b (FIG. 3) in the opposite direction, compared with the preceding drive direction thereof, so that diaphragm 30 is closed again due to the actuation of its control lever 32a, for example from left ro right, until it engages the adjustable stop means 32g. Then, as the friction clutch 32h is allowed to slip, the motor 32e continues to rotate until the timing device motor M again switches briefly contact $M_a$, so as to close temporarily the above-mentioned circuit 3) and, therefore, to return the contacts $T_a$ and $T_b$ of bistable relay T to their respective positions which are shown in FIG. 15. The opening of said contact $T_a$ in circuit 4) results in the dropping of relay U and therefore in the opening of the corresponding energizing circuits of motor 32e and timing device motor M, whereby the whole circuit resumes its initial condition as illustrated in FIG. 15 so as to permit the accomplishment, as already described, of another sub-colors removing operation when contact $c_{10}$ is re-closed by the passage of another corresponding perforation of punched card 82.

Figure 16:
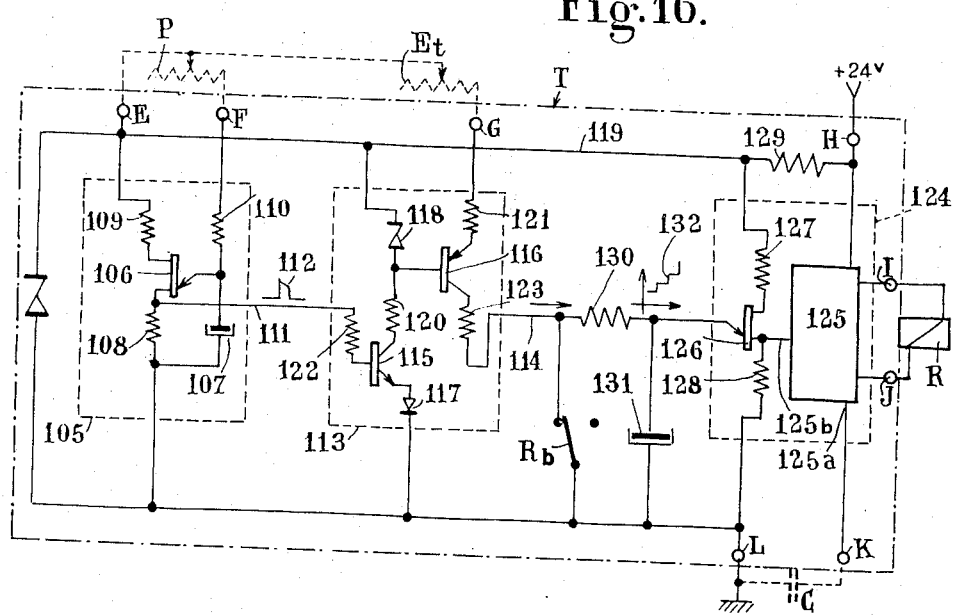

FIG. 16 is the detailed circuit diagram of a typical embodiment of a timer circuit T, comprising six input terminals E, F, G, H, K and L, and two output terminals I and J, which may be used for constituting any of timer circuits $T_p$, $T_a$ and $T_r$ illustrated as "black boxes" in FIGS. 13, 14 and 15. In the specific embodiment illustrated in FIG. 16, the timer circuit T comprises firstly a relaxation stage 105, consisting essentially of a unijunction transistor 106, a capacitor 107 and ohmic resistors 108 (connected to the input terminal L of timer circuit T) and 109, 110 (connected to the input terminals E and F of timer circuit T). Thus, periodic pulses are produced in the output line 111 of this relaxation stage 105, such as 112, of which the recurrence frequency is subordinate to the value at which the potentiometer P, inserted between the input terminals E and F of timer circuit T, was pre-set. The relaxation stage 105 is constituted, and the potentiometer P is selected, preferably so as to enable varying the recurrence frequency of output pulses 112 in the ratio of 1 to 100. The output pulses 112 of relaxation stage 105 are fed to a power stage 113, which converts the voltage pulses 112 into current pulses, appearing in the output line 114, and having an amplitude subordinate to the adjusted value of a potentiometer Et, which is inserted across the input terminals E and G of timer circuit T. In the embodiment contemplated herein the power stage 113 comprises essentially an n-p-n transistor 115, a p-n-p transistor 116, a semi-conductor diode 117, a Zener diode 118 connected to the supply line 119 of timer circuit T, and also ohmic resistors. Of these resistors one, 120, is connected to the aforesaid Zener diode 118, another 121 is connected to the input terminal G of timer circuit T, and finally two other resistors 122, 123 are connected to line 111 and to line 114, respectively. Skilled people will easily understand that the amplitude of the current pulses which are produced in the output line 114 of power stage 113, with a recurrence frequency of same value as that of pulses 112, depends on the adjusted value of potentiometer $E_t$ inserted across the terminals E and G of timer circuit T. The output stage 124 of this timer circuit T consists essentially of a bistable multivibrator circuit 125 of a known, suitable type, comprising a first trigger input 125a connected to terminal K of timer circuit T; a second trigger input 125b having connected thereto a voltage threshold device, consisting essentially of a unijunction transistor 126 and a pair of ohmic resistors 127, 128, and a pair of output lines connected to the output terminals I and J, respectively, of timer circuit T. The reference letter R designates a load relay connected across the output terminals I and J of timer circuit T (in FIGS. 13 to 15, this load is relay $R_p$, $R_a$ or $R_r$, respectively). This relay R further includes a reversing contact $R_b$, which, in its rest position, connects the output line 114 of power stage 113 to the grounded output terminal L of timer circuit T. Stages 105, 113 and 124 of timer circuit T are supplied with a 24-Volt d.c. voltage, which is fed across its terminal H, to which the supply or mains line 119 is connected through a ballast resistor 129, and its grounded terminal L.

The delivery of a voltage pulse across the input terminals K and L of timer circuit T, for example the discharge pulse from a capacitor such as C, causes the bistable circuit 125 to be switched to its state in which it applies a voltage across the terminals of the coil of relay R. When contact $R_b$ of relay R is inverted, the current pulses produced in output line 114 of power stage 113 are transmitted through a charging resistor 130 to one of the two plates of a capacitor 131, of which the other plate is connected to input terminal L, so that a direct current voltage, increasing stepwise, as shown at 132, is obtained across the plates of this capacitor. When the magnitude of this increasing d.c. voltage attains the threshold value whereat the unijunction transistor 126 becomes conductive (this transistor having its gate electrode connected to the common point of charging resistor 130 and capacitor 131), the signal fed to the second trigger input 125b of bistable circuit 125 restores this last-mentioned circuit to its state in which no voltage is delivered across the output terminals I and J of timer circuit T, so that the relay R is released and the return of its contact $R_b$ to its rest position causes the capacitor 131 to be discharged through resistor 130. It is thus clear that the duration of each of the pulse fed by the bistable circuit 125 across the output terminals I and J depends both on the frequency and on the amplitude of the current pulses in the output line 114 and therefore on the adjustments of potentiometers P and $E_t$.

The apparatus described hereinabove is operated as follows. The sequence of operations, which depends on the selection process contemplated and possibly on the user's requirements, is memorized in a so-called operational punched card such as 82. Therefore, there is a number of operational punched cards corresponding to the number of contemplated different sequences of operations, respectively adapted to the various processes and also to the requirements of the various users. On the other hand, the various adjustments of the potentiometer knobs $p_1$ to $p_5$, $q_1$ to $q_4$ and $r_1$ to $r_3$ (FIG. 5)

to permit obtaining suitable separation negatives from an original having given characteristics, specially densitometric characteristics, are memorized for instance in so-called adjustment cards, which are utilized later, for pre-adjusting or presetting said potentiometers when separation negatives are to be obtained from an original having characteristics substantially akin to those of an original of which the characteristics are recorded in one of said adjustment cards. However, the results obtained with this method might be impaired by the ageing or the more or less rapid evolution of certain components of the apparatus, or possibly by the substitution of new components for old ones (such as the replacement of the light source lamp 21, the exchanging of at least one of half-tone screens 9a to 9d, the use of a film 8 of different type, changes intervening in the development techniques, ageing of filters 28a to 28f, of the light source lamp 21, and also of components, specially the electronic components of timer circuits T). The correcting potentiometers $E_{t1}$ to $E_{t5}$ and $G_1$ to $G_4$ (to which the control knobs $g_1$ to $g_4$ of FIG. 5 correspond) permit "re-calibrating" the apparatus, with due consideration for the various causes, mentioned hereinabove, of the variation in he components, so as to keep at a constant standard the quality of the results obtained by operating in accordance with the information previously memorized in said adjustment cards. To this end, a reference original is used, which is free of ageing. The correcting potentiometers mentioned hereinabove being preset to their average value, the adjusting potentiometers $P_i$ and $Q_i$ are adjusted empirically in order to obtain perfectly satisfactory separation negatives from this reference original, and the corresponding adjustments, also called "initial adjustments", of the potentiometers $P_i$ and $Q_i$ are recorded in a so-called reference card. Then, the calibration of the apparatus is checked at regular intervals by causing it to operate on said reference original with said "initial adjustments" of potentiometers $P_i$ and $Q_i$. When the separation negatives thus obtained are no longer satisfactory, the apparatus is calibrated again by modifying the adjustments of correcting potentiometers $E_{ti}$ and $G_i$. Of course, the adjustments of the correcting potentiometers are preserved in the time interval between two successive recalibrations of the apparatus, exposure times adapted to each original being set in this time interval by pre-adjusting the potentiometers $P_i$ and $Q_i$, specially in accordance with the adjustment values recorded in said adjustment cards, which information remains valid in the course of time due to the above-described periodic re-calibration.

What I claim is:

1. An apparatus for making a plurality of enlarged color separation negatives from a color original, comprising a light-tight casing having upper, lower and lateral walls, a door provided in one of said lateral walls, a window provided in said upper wall, an original holder plate mounted in said window, a light-box mounted externally of said casing and above said original holder plate, a filter carrier adapted to receive a plurality of separation color filters, said filter carrier being mounted outside of said casing and being movable for insertion of a selected one of said color filters between said light-box and said original holder plate, an enlarging optical system comprising a lens having a predetermined optical field, plus a diaphragm and a shutter adapted on said lens, a film holder plate, said optical system and said film holder plate being mounted inside of said casing one above the other and being vertically movable for adjustment thereof at respective selected levels under said original holder plate, a film carrier with a same plurality of separate areas each having a form and size adapted to the optical field of said lens, a single film having a same plurality of separate areas for recording thereon the respective separation negatives, said single film being placed on said film carrier with the respective film areas positioned in substantial registration with the respective areas of said film carrier, and said film carrier being mounted on said film holder plate to be movable thereon, and means for moving said film carrier on said film holder plate through successive positions, in which said carrier areas are successively inserted in the optical field on said lens, each of said positions corresponding to insertion of a respective one of said color filters between said light-box and said original holder plate.

2. The apparatus of claim 1, wherein said film carrier is movable in two perpendicular directions on said film holder plate.

3. An apparatus for making a plurality of enlarged color separation negatives from a color original, comprising a light-tight casing having upper, lower and lateral walls, a door provided in one of said lateral walls, a window provided in said upper wall, an original holder plate mounted in said window, a light-box mounted externally of said casing and above said original holder plate, a filter carrier adapted to receive a plurality of separation color filters, said filter carrier being mounted outside of said casing, electromotor means for selecting one of the color filters received in said filter carrier and for moving the selected filter to a working position between said light-box and said original holder plate, an enlarging optical system comprising a lens having a predetermined optical field, plus an adjustable diaphragm and a shutter adapted on said lens, electromotor means for adjusting said diaphragm, means for opening said shutter during adjustable, accurately determined exposure times, a film holder plate, said optical system and said film holder plate being mounted inside of said casing one above the other, and being vertically movable for adjustment thereof at respective selected levels under said original holder plate, a film carrier with a same plurality of separate areas each having a form and size adapted to the optical field of said lens, a single film having a same plurality of separate areas for recording thereon the respective separation negatives, said single film being placed on said film carrier with the respective film areas positioned in substantial registration with the respective areas of said film carrier, and said film carrier being movably mounted on said film holder plate, and electromotor means for moving said film carrier on said film holder plate through successive positions in which said carrier areas are successively inserted in the optical field of said lens, each of said positions corresponding to insertion of a respective one of said color filters between said light-box and said original holder plate.

4. The apparatus of claim 3, which further comprises a programmed automatic control unit for controlling said electromotor means in a programmed sequence.

5. The apparatus of claim 4, wherein said automatic control unit comprises reading means for reading an exchangeable program memory, selected in a program memory library.

6. The apparatus of claim 3, further comprising a same plurality of separate half-tone screens disposed respectively on said separate film areas.

7. The apparatus of claim 3, wherein said filter carrier comprises a carrier casing having the front face and one lateral face both open, the said plurality of filter plates being superposed in said carrier casing, first electromotor-controlled means disposed at the level of said filter working position for moving one of said filter plates from inside of said carrier box, through its open front face, to said filter working position, and second electromotor-controlled means for moving vertically said carrier casing with its one open lateral face passing along said first moving means, whereby the selected filter plate is brought at the level of said first moving means.

8. The apparatus of claim 3, wherein said film carrier comprises a tray mounted on said film holder plate and being movable in a first direction, first electromotor-controlled means for moving said tray in said first direction between two end positions, a film holder table mounted on said tray and being movable in a second direction, perpendicular to said first direction, and second electro-motor-controlled means for moving said table in said second direction between two end positions, said end positions of said movable tray and film holder table being predetermined in accordance with said working positions of said film carrier.

9. The apparatus of claim 3, which further comprises an auxiliary light source, mounted inside of said casing and being movable between a working position above the film carrier and a retracted position, and electromotor-controlled means for moving said auxiliary light source from its retracted position to its working position, and, after an adjustable, accurately determined auxiliary exposure time, back to its retracted position.

10. The apparatus of claim 3, wherein said diaphragm adjusting means comprises a diaphragm adjusting member movable in two opposite directions, two adjustable stop members disposed for respectively stopping said movable adjusting member in said two directions, means for moving said adjusting member, said moving means comprising an electromotor having first and second separate energizing circuits for rotation in two opposite directions respectively, a friction clutch for coupling said moving means and said electromotor, first and second means for respectively closing said first and second energizing circuits of said electromotor during a predetermined adjustment time, means for actuating said second closing means and time delay means for releasing said actuating means an accurately determined time delay after re-opening of the previously closed first energizing circuit.

11. The apparatus of claim 3, further comprising means for accurately determining the adjustable exposure times, said means comprising at least one timer circuit having adjusting input terminals, starting input terminals and output terminals, at least one first adjustable electric component connected to said adjusting input terminals, means to transmit an electric starting signal to said starting input terminals, and an electromagnetic relay having a coil connected to said output terminals, said timer circuit being adapted to be started by said starting signal to generate on its output terminals an electric pulse having a duration depending on the adjustment of said first electric component.

12. The apparatus of claim 11, wherein said shutter opening means comprises an electromagnet having an energizing circuit, and means responsive to said electromagnetic relay for closing said energizing circuit.

13. The apparatus of claim 11, wherein said timer circuit further comprises correcting input terminals, and at least one second adjustable electric component is connected to said correcting input terminals, said timer circuit being further adapted to generate an output electric pulse having a duration multiplied by a factor adjustable by means of said second electric component between a first value substantially lower, and a second value substantially higher than 1.

14. The apparatus of claim 13, comprising a same plurality of said first and second adjustable electric components, and means for selectively switching said first and second electric components respectively to said adjusting input terminals and said correcting input terminals of said timer circuit.

15. The apparatus of claim 13, wherein said timer circuit comprises a relaxation multivibrator stage connected to the adjusting input terminals of said timer circuit and adapted to generate electric voltage pulses with a recurrence frequency depending on the adjustment of said first electric component, a power stage connected to the correcting input terminals of said timer circuit, said power stage being adapted to be driven by said electric voltage pulses and to generate electric current pulses with a same recurrence frequency and an amplitude depending on the adjustment of said second electric component, a capacitor adapted to be charged by said electric current pulses, a voltage threshold circuit adapted to sense the charging voltage of said capacitor and to generate a reset signal when said charging voltage exceeds a predetermined threshold, and a flip-flop having a set input connected to one of the starting input terminals of said timer circuit, a reset input adapted to receive said reset signal, and outputs connected to the output terminals of said timer circuit.

16. An apparatus for making a plurality of enlarged color separation negatives from a color original, comprising a stationary frame, and, mounted on said frame, an original holder plate, a light-box mounted above said original holder plate, a filter carrier adapted to receive a plurality of separation color filters, said filter carrier being movable for insertion of a selected one of said color filters between said light-box and said original holder plate, an enlarging optical system comprising a lens having a predetermined optical field, plus a diaphragm and a shutter adapted on said lens, a film holder plate mounted in a substantially parallel relationship to said original holder plate, said optical system and said film holder plate being mounted on said frame one above the other and being vertically movable for adjustment thereof at respective selected levels under said original holder plate, a film carrier with a same plurality of separate areas each having a form and size adapted to the optical field of said lens, a single film having a same plurality of separate areas for recording thereon the respective separation negatives, said single film being placed on said film carrier with the respective film areas positioned in substantial registration with the respective areas of said film carrier, and said film carrier being mounted on said film holder plate to be movable thereon, and means for moving said film carrier on said film holder plate through successive positions in which said carrier areas are successively inserted in the optical field of said lens, each of said positions corresponding to insertion of a respective one of said color filters between said light-box and said original holder plate.

17. The apparatus of claim 16, wherein said film carrier is movable in two substantially perpendicular directions on said film holder plate.

18. The apparatus of claim 16, wherein said film holder plate is provided with a masking cover having a window in the optical field of said lens, said film carrier and the film placed thereon being movable between said film holder plate and said masking cover for registration of a selected one of said separate film areas with said window.

19. An apparatus for making a plurality of enlarged color separation negatives from a color original, comprising a light-tight casing having upper, lower and lateral walls, a door provided in one of said lateral walls, a window provided in said upper wall, an original holder plate mounted in said window, a light-box mounted externally of said casing and above said original holder plate, a filter carrier adapted to receive a plurality of separation color filters, said filter carrier being mounted outside of said casing and being movable for insertion of a selected one of said color filters between said light-box and said original holder plate, an enlarging optical system comprising a lens having a predetermined optical field, plus a diaphragm and a shutter adapted on said lens, a film holder plate, said optical system and said film holder plate being mounted inside of said casing one above the other and being vertically movable for adjustment thereof at respective selected levels under said original holder plate, a vacuum operated film carrier table with a same plurality of separate areas each having a form and size adapted to the optical field of said lens, a single film having a same plurality of separate areas for recording thereon the respective separation negatives, said single film being placed on said film carrier table with the respective film areas positioned in substantial registration with the respective areas of said film carrier table, and said film carrier table being mounted on said film holder plate to be movable thereon and means for moving said film carrier table on said film holder plate through successive positions in which said carrier table areas are successively inserted in the optical field of said lens, each of said positions corresponding to insertion of a respective one of said color filters between said light-box and said original holder plate.

20. The apparatus of claim 19, wherein said light-box is provided with ventilation apertures and is movable in relation to said casing for free access to said original holder plate.

21. The apparatus of claim 19, wherein a column is vertically mounted inside of said casing, said optical system and said film holder plate being slidably mounted on said vertical column, one above the other.

22. The apparatus of claim 19, wherein a retractable auxiliary light source is inserted between said optical system and said film carrier, mounted on said film holder plate.

* * * * *